United States Patent
He et al.

(10) Patent No.: US 12,220,084 B2
(45) Date of Patent: Feb. 11, 2025

(54) TOASTER

(71) Applicant: TSANN KUEN (ZHANG ZHOU) ENTERPRISE CO., LTD., Zhang Zhou (CN)

(72) Inventors: Yangtai He, Zhangzhou (CN); Ziwang Wu, Zhangzhou (CN)

(73) Assignee: TSANN KUEN (ZHANG ZHOU) ENTERPRISE CO., LTD., Zhang Zhou (CN)

( * ) Notice: Subject to any disclaimer, the term of this patent is extended or adjusted under 35 U.S.C. 154(b) by 997 days.

(21) Appl. No.: 17/208,883

(22) Filed: Mar. 22, 2021

(65) Prior Publication Data

US 2021/0353101 A1     Nov. 18, 2021

(30) Foreign Application Priority Data

May 13, 2020   (CN) .......................... 202020786445.8

(51) Int. Cl.
  *A47J 37/08*     (2006.01)
  *H01F 7/06*      (2006.01)

(52) U.S. Cl.
  CPC .......... *A47J 37/0842* (2013.01); *H01F 7/064* (2013.01)

(58) Field of Classification Search
  CPC .............................. H01F 7/064; A47J 37/0842
  USPC .......................................................... 99/327
  See application file for complete search history.

(56) References Cited

U.S. PATENT DOCUMENTS

| | | | | |
|---|---|---|---|---|
| 3,129,650 A | * | 4/1964 | Visos .................. | A47J 37/0814 99/329 R |
| 2006/0201334 A1 | * | 9/2006 | Belanger ............. | A47J 37/0842 99/389 |
| 2011/0132202 A1 | * | 6/2011 | Zhang ................. | A47J 37/0842 99/332 |
| 2012/0097044 A1 | * | 4/2012 | Choi ................... | A47J 37/0842 99/327 |
| 2013/0334203 A1 | * | 12/2013 | Legatti ................ | H05B 1/0261 219/509 |
| 2016/0316967 A1 | * | 11/2016 | Yan ..................... | A47J 37/0814 |

FOREIGN PATENT DOCUMENTS

CN              203632215 U   *   6/2014

* cited by examiner

*Primary Examiner* — Eric S Stapleton
*Assistant Examiner* — Yeong Juen Thong
(74) *Attorney, Agent, or Firm* — Cheng-Ju Chiang (57) ABSTRACT

In the toaster, the first switch is connected with the neutral wire terminal and the heating element; the second switch and the power-off protection switch are connected in series between the live wire terminal and the heating element; the output end of the rectifier circuit is respectively connected with the electromagnet and the timing control circuit; when the lifting plate moves from the ejected position to the working position, the first pressing part depresses the first switch to a closed state, the second pressing part depresses each of the second switch and the power-off protection switch to a closed state, the electromagnet is energized and attracts the attracting part, the heating element starts to work; when the electromagnet is disconnected from the timing control circuit, the attracting part is released, the lifting plate springs upward, the power-off protection switch changes to an opened state, and the heating element stops working.

11 Claims, 5 Drawing Sheets

TOASTER

CROSS-REFERENCE TO RELATED APPLICATION

The present invention is based on and claims the priority of Chinese patent application No. 202020786445.8, filed on May 13, 2020. The content of the above-identified application is incorporated herein by reference.

TECHNICAL FIELD

The present invention relates to the technical field of household appliances, and in particular, to a toaster.

BACKGROUND OF THE INVENTION

The toaster is provided with a bread grill and a lifting plate connected with the bread grill. In use, the lifting plate drives the bread grill down to put the bread on the bread grill into the baking room for baking. During the baking period, the lifting plate is fixed by an electromagnet. When the baking time is over, the electromagnet is powered off, and the lifting plate and the bread grill are sprung up to eject the baked bread. In use, if the switch connected with the live wire terminal and the switch connected with the neutral wire terminal cannot be normally changed to opened state, such as short circuit or failure, the toaster will be energized and heated continuously, there is the possibility of ignition, and additional power-off protection mechanism is required. Therefore, it is necessary to design a toaster with power-off protection function.

SUMMARY OF THE INVENTION

In view of the above technical problem, the present invention provides a toaster, which can realize power-off protection function when the switch connected with the live wire terminal and the switch connected with the neutral wire terminal cannot be normally changed to opened state.

In order to solve the above technical problem, the present invention provides a toaster, which includes:
a neutral wire terminal and a live wire terminal;
a heating circuit including a first switch, a second switch, a power-off protection switch and a heating element, the first switch connected between the neutral wire terminal and the heating element, the second switch and the power-off protection switch connected in series between the live wire terminal and the heating element, the power-off protection switch including at least one switch;
an electromagnet arranged on a base of the toaster;
a timing control circuit connected with the electromagnet;
a rectifying circuit with input ends thereof connected with the heating circuit and an output end thereof respectively connected with the electromagnet and the timing control circuit;
a lifting plate connected with an elastic element, the lifting plate including an attracting part, a first pressing part and a second pressing part;
wherein when the lifting plate overcomes an elastic force of the elastic element and moves from an ejected position toward the base to a working position, the first pressing part depresses the first switch to a closed state, the second pressing part depresses each of the second switch and the power-off protection switch to a closed state, the electromagnet is energized and attracts the attracting part to maintain the lifting plate in the working position, and the heating element starts to work;
when the electromagnet is disconnected from the timing control circuit, the attracting part is released, the lifting plate springs upward under the action of the elastic element, the power-off protection switch changes to an opened state, and the heating element stops working.

Further, the first switch, the electromagnet, the second switch and the power-off protection switch are arranged on the base of the toaster in sequence, the power-off protection switch includes a third switch, the first switch, the second switch and the third switch are arranged sequentially in a straight line on the base, and the electromagnet is located between the first switch and the second switch.

Further, the attracting part is located between the first pressing part and the second pressing part, the first pressing part is located above the first switch, the attracting part is located above the electromagnet, and the second pressing part is located above the second switch and the third switch.

Further, the second pressing part includes a bottom plate, a side plate and at least one reinforcing plate, the bottom plate and the first pressing part are lower than the attracting part and parallel to the base, the side plate is located above the bottom plate and vertically connected with the bottom plate, the reinforcing plate connects the side plate and the bottom plate.

Further, the toaster further includes a grill and a connecting shaft, the connecting shaft is located on the outside of the grill and is arranged vertically to the base, the lifting plate is slidably connected with the connecting shaft and the grill, the elastic element is located between the lifting plate and the base, when the electromagnet releases the attracting part, the elastic element springs the lifting plate upward.

Further, the lifting plate further includes an operation part which protrudes laterally from the lifting plate at a position corresponding to the attracting part.

Further, the rectifier circuit includes a first diode, a first resistor and a first capacitor, the first diode, the first resistor and the first capacitor are connected in series between a first input end of the rectifier circuit and a second input end of the rectifier circuit, the electromagnet is electrically connected to a node of the rectifier circuit after the first diode.

Further, two ends of the electromagnet are connected in parallel with a second diode.

Further, the rectifier circuit further includes a second resistor, a first end of the second resistor is electrically connected to a node between the first resistor and the first capacitor, and a second end of the second resistor is electrically connected to an input end of the timing control circuit.

Further, a voltage stabilizing diode and a second capacitor which are connected in parallel are electrically connected between the input end of the timing control circuit and the ground.

As described above, in the toaster of the present invention, the first switch is connected with the neutral wire terminal and the heating element; the second switch and the power-off protection switch are connected in series between the live wire terminal and the heating element; the output end of the rectifier circuit is respectively connected with the electromagnet and the timing control circuit; when the lifting plate moves from the ejected position toward the base to the working position, the first pressing part of the lifting plate depresses the first switch to a closed state, the second pressing part of the lifting plate depresses each of the second switch and the power-off protection switch to a closed state, the electromagnet is energized and attracts the attracting part of the lifting plate, and the heating element starts to work; when the electromagnet is disconnected from the timing control circuit, the attracting part is released, the lifting plate springs upward, the power-off protection switch changes to an opened state, and the heating element stops working. In the toaster of the present invention, a power-off protection switch is additionally connected in series with the live wire terminal, such that the power-off protection function can be realized when the first switch and the second switch cannot be normally changed to opened state. The structure is simple, reliable and the cost is low.

DETAILED DESCRIPTION OF PREFERRED EMBODIMENTS

In the following, the implementation mode of the present invention is described by specific embodiments. Persons familiar with the technology can easily understand other advantages and effects of the present invention from the contents disclosed in the specification.

In the following description, several embodiments of the present invention are described with reference to the accompanying drawings. It should be understood that other embodiments may be used and that changes in mechanical composition, structure, electricity and operation may be made without departing from the spirit and scope of the present invention. The following detailed description should not be considered restrictive, and the scope of the embodiments of the present invention is limited only by the claims of the patent. The terms used herein are intended to describe specific embodiments only and are not intended to limit the present invention.

Figure 1:
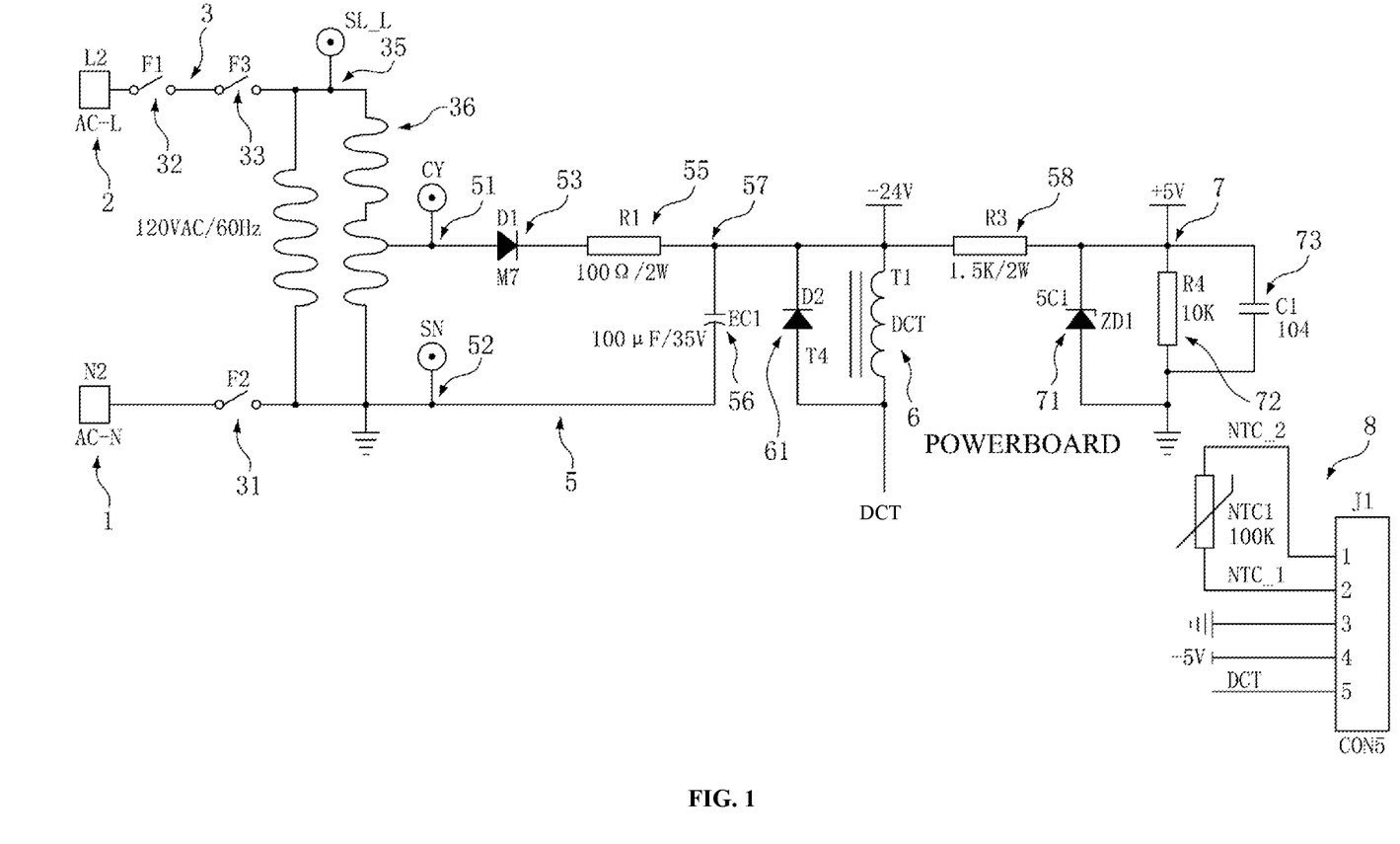
FIG. 1 is a schematic diagram of the circuit structure of a toaster according to an embodiment.
Figure 2:
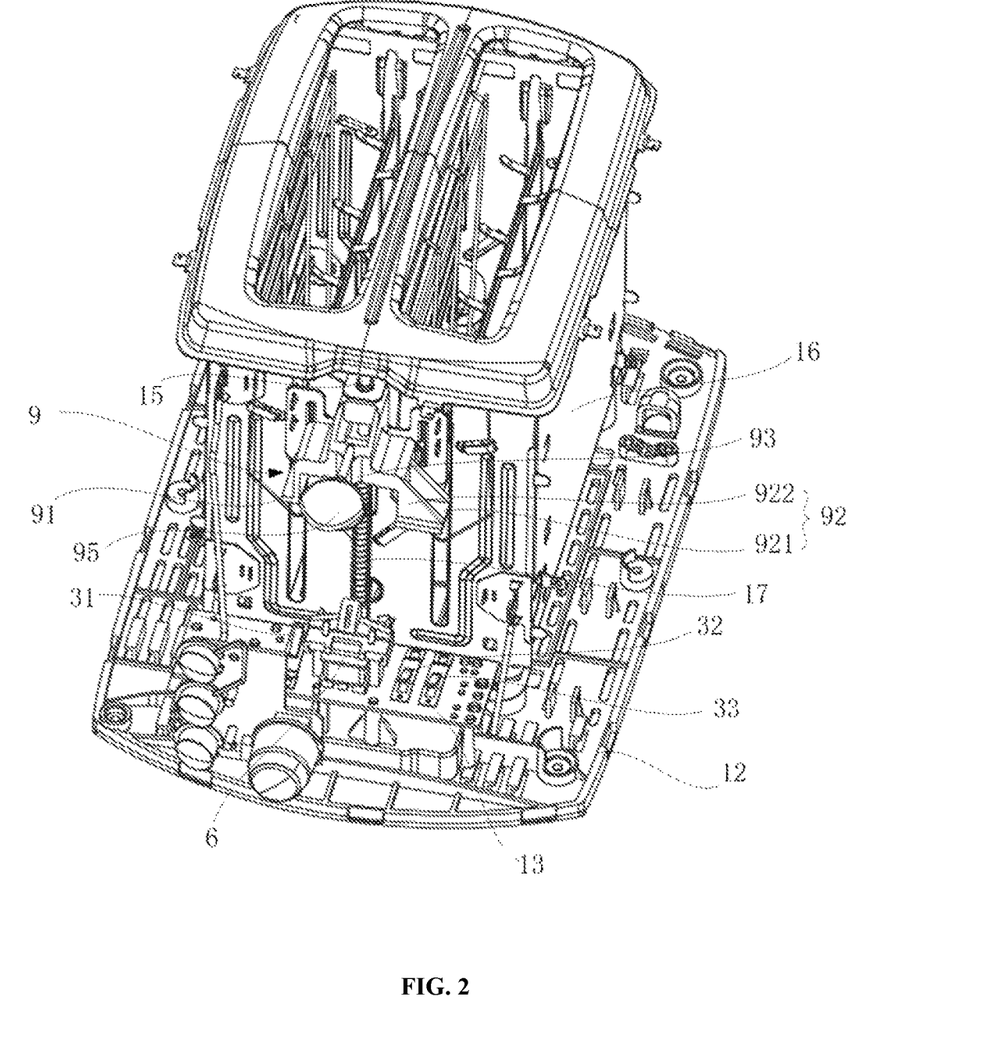
FIG. 2 is a structural diagram of the toaster in the ejected position according to an embodiment.
Figure 3:
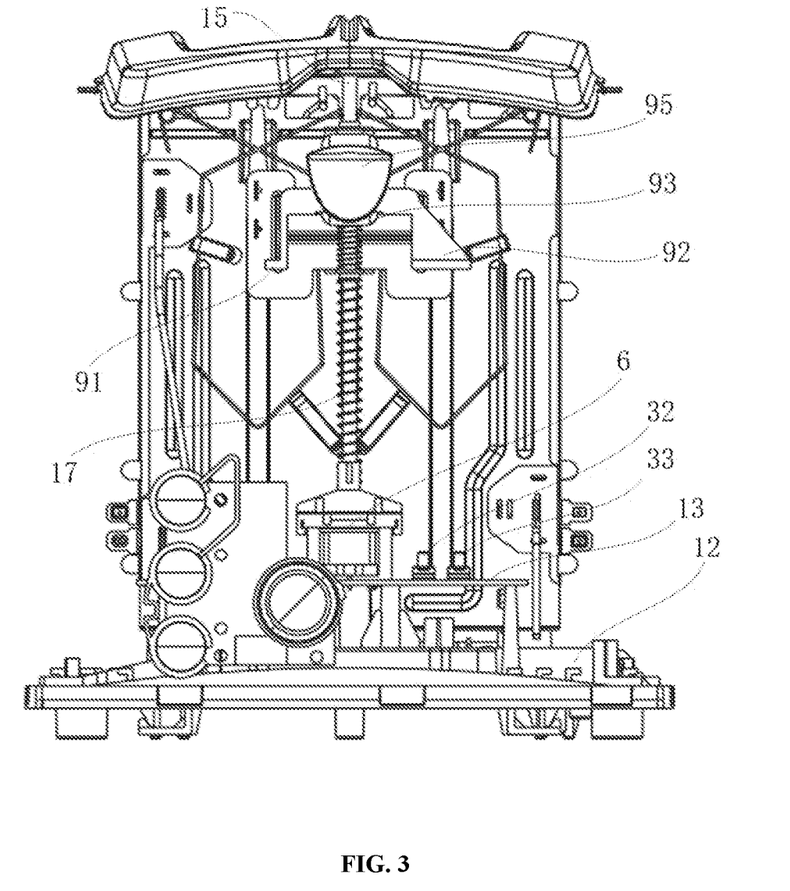
FIG. 3 is another structural diagram of the toaster in the ejected position according to an embodiment.

FIG. 1 is a schematic diagram of the circuit structure of a toaster according to an embodiment. FIG. 2 is a structural diagram of the toaster in the ejected position according to an embodiment. FIG. 3 is another structural diagram of the toaster in the ejected position according to an embodiment. Referring to FIG. 1, FIG. 2 and FIG. 3, the toaster of this embodiment includes a neutral wire terminal 1, a live wire terminal 2, a heating circuit 3, an electromagnet 6, a timing control circuit (not shown), a rectifier circuit 5, a lifting plate 9, an elastic element 17, a grill 16 and a connecting shaft 15.

The heating circuit 3 includes a first switch 31, a second switch 32, a power-off protection switch and a heating element 36. The first switch 31 is connected between the neutral wire terminal 1 and the heating element 36. The second switch 32 and the power-off protection switch are connected in series between the live wire terminal 2 and the heating element 36. The power-off protection switch includes at least one switch. The first switch 31, the electromagnet 6, the second switch 32 and the power-off protection switch are arranged on the base 12 of the toaster in sequence. In this embodiment, the power-off protection switch includes a third switch 33. The first switch 31, the second switch 32 and the third switch 33 are arranged sequentially in a straight line on the base 12, and the electromagnet 6 is located between the first switch 31 and the second switch 32. As shown in FIG. 2 and FIG. 3, a circuit board 13 is arranged on the base 12, and the first switch 31, the electromagnet 6, the second switch 32 and the third switch 33 are arranged in sequence on the circuit board 13 and electrically connected with the interfaces on the circuit board 13. By connecting an additional power-off protection switch in series at the live wire terminal 2, when the first switch 31 and the second switch 32 are short circuited, as long as the power-off protection switch is opened, the connection between the circuits of the toaster and the live wire can be cut off, so as to realize the function of power-off protection.

The grill 16 is used to contain bread. The connecting shaft 15 is located on the outside of the grill 16 and is arranged vertically to the base 12. The lifting plate 9 is slidably connected with the connecting shaft 15 and the grill 16. The elastic element 17 is sleeved on the outside of the connecting shaft 15 and is located between the lifting plate 9 and the base 12, and the lifting plate 9 can overcome the elastic force of the elastic element 17 to move from the ejected position to the working position along the connecting shaft 15 toward the base 12.

The lifting plate 9 includes an attracting part 93, a first pressing part 91 and a second pressing part 92. The attracting part 93 is an iron-containing part and can be attracted by the electromagnet 6. The first pressing part 91 is located above the first switch 31, the attracting part 93 is located above the electromagnet 6, and the second pressing part 92 is located above the second switch 32 and the third switch 33. When the lifting plate 9 overcomes the elastic force of the elastic element 17 and moves from the ejected position toward the base 12 to the working position, the first pressing part 91 will depress the first switch 31 to a closed state, and the second pressing part 92 will depress each of the second switch 32 and the third switch 33 to a closed state, such that the heating element 36 starts to work. When the lifting plate 9 springs upward under the action of the elastic element 17, the third switch 33 loses the external pressure and changes to an opened state, and then the connection with the live wire is cut off, such that the heating element 36 stops working. Even if the first switch 31 and the second switch 32 are short circuited, the power-off protection can also be realized. In this embodiment, in order to facilitate the operation of the lifting plate 9, the lifting plate 9 further includes an operation part 95 which protrudes laterally from the lifting plate 9 at a position corresponding to the attracting part 93.

The attracting part 93 is located between the first pressing part 91 and the second pressing part 92. The projection of the first pressing part 91 on the base 12 covers the first switch 31, and the projection of the second pressing part 92 on the base 12 covers both the second switch 32 and the third switch 33, to effectively realize pressing. As shown in FIG. 2, the second pressing part 92 includes a bottom plate 921, a side plate 923 and at least one reinforcing plate 922. The projection of the bottom plate 921 on the base 12 covers both the second switch 32 and the third switch 33. The bottom plate 921 and the first pressing part 91 are lower than the attracting part 93 and parallel to the base 12. The side plate 923 is located above the bottom plate 921 and vertically connected with the bottom plate 921. The reinforcing plate 922 connects the side plate 923 and the bottom plate 921 to reinforce the structure. By arranging the electromagnet 6 between the first switch 31 and the second switch 32, arranging the attracting part 93 correspondingly between the first pressing part 91 and the second pressing part 92, designing the second pressing part 92 to cause its projection on the base 12 to cover both the second switch 32 and the third switch 33, and providing the reinforcing plate 922 on the second pressing part 92, the overall stress distribution is reasonable and the structure is stable and reliable.

Figure 4:
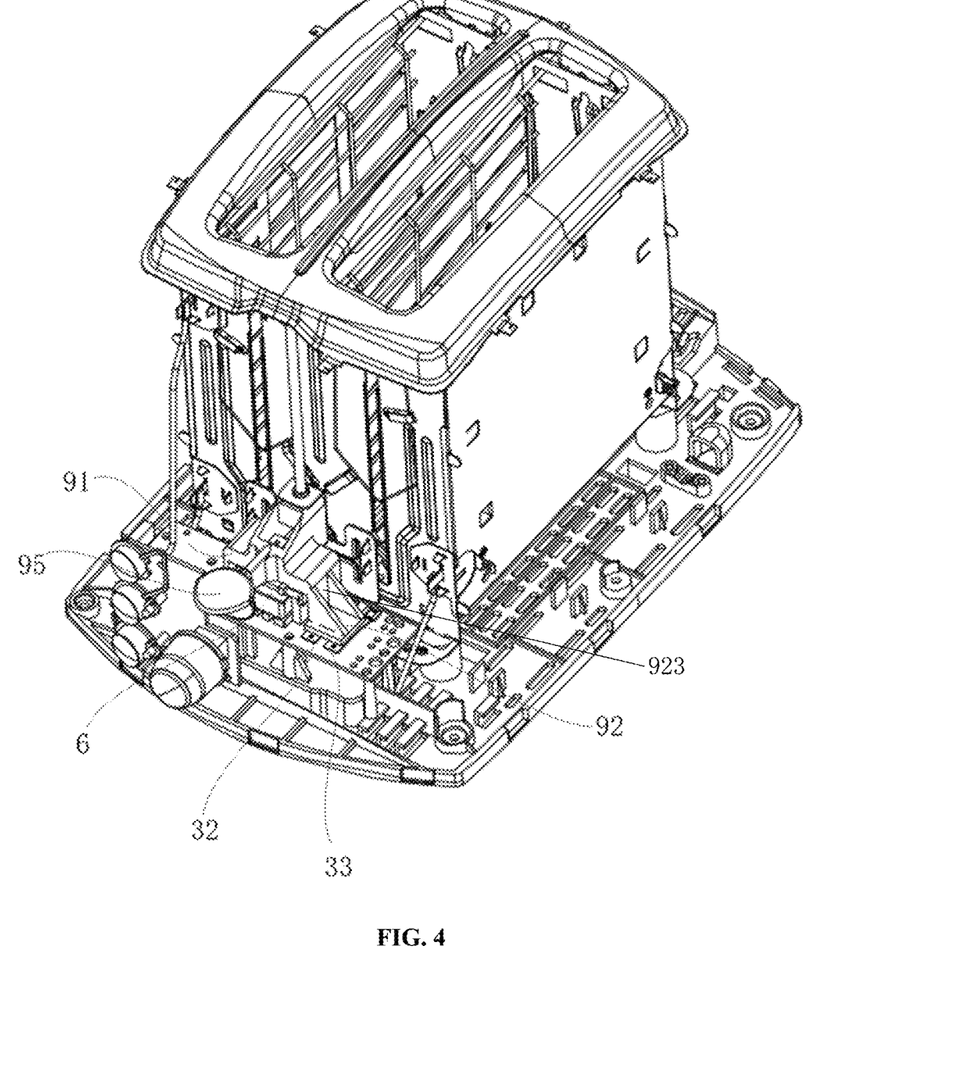
FIG. 4 is a structural diagram of the toaster in the working position according to an embodiment.
Figure 5:
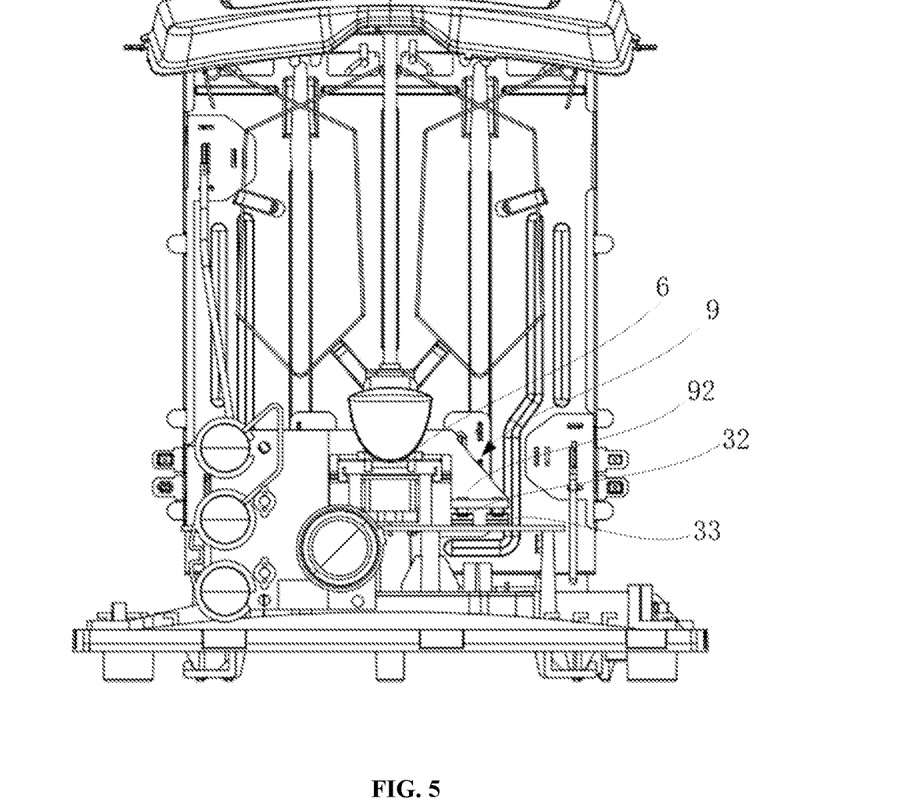
FIG. 5 is another structural diagram of the toaster in the working position according to an embodiment.

Referring to FIG. 1, the timing control circuit (not shown) is connected with the electromagnet 6 to control the operation of the electromagnet 6. Specifically, one input end 7 of the timing control circuit is connected with the fourth port of a circuit substrate 8, the other input end of the timing control circuit is connected with the third port of the circuit substrate 8 and grounded, the output end of the timing control circuit is connected with the fifth port of the circuit substrate 8, and the fifth port of the circuit substrate 8 is connected with the electromagnet 6, so that the timing control circuit can control the operation of the electromagnet 6. In use, as shown in FIG. 4 and FIG. 5, when the first switch 31 (see FIG. 2), the second switch 32 and the third switch 33 are each depressed to a closed state, the electromagnet 6 is connected with the timing control circuit and energized to attract the attracting part 93 (see FIG. 2) of the lifting plate 9 to maintain the lifting plate 9 in the working position, such that the first switch 31, the second switch 32 and the third switch 33 are each kept at a closed state. As shown in FIG. 2 and FIG. 3, after timing is over, the timing control circuit is disconnected from the electromagnet 6, the lifting plate 9 is released and moves up under the action of the elastic element 17, and the third switch 33 loses the pressing action of the external pressure and changes to an opened state, such that even if the first switch 31 and the second switch 32 are short circuited, the power-off protection function can be realized.

Continuing to refer to FIG. 1, the input ends of the rectifier circuit 5 are connected with the heating circuit 3, and the output end of the rectifier circuit 5 is connected with the electromagnet 6 and the timing control circuit respectively. Specifically, a branch is led out from the heating element 36, a first terminal 51 and a second terminal 52 are provided as the voltage output ends, and are respectively connected with the first input end and the second input end of the rectifier circuit 5, so as to extract part of the voltage to supply the rectifier circuit 5. One end of the heating element 36 is connected with a third terminal 35 to obtain voltage output, the third terminal 35 is connected with the third switch 33, the other end of the heating element 36 is grounded, one end of the first switch 31 corresponding to the heating element 36 is grounded, and the second terminal 52 is grounded.

The rectifier circuit 5 includes a first diode 53, a first resistor 55 and a first capacitor 56. The first diode 53, the first resistor 55 and the first capacitor 56 are connected in series between the first input end of the rectifier circuit 5 and the second input end of the rectifier circuit 5. The electromagnet 6 is electrically connected to a node of the rectifier circuit 5 after the first diode 53. In this embodiment, the anode of the first diode 53 is connected with the first input end of the rectifier circuit 5 or the first terminal 51, the cathode of the first diode 53 is connected with the first end of the first resistor 55, and the two ends of the first capacitor 56 are respectively connected with the second end of the first resistor 55 and the second input end of the rectifier circuit 5 or the second terminal 52. In actual practice, the first diode 53 may also be set between the first capacitor 56 and the second input end of the rectifier circuit 5. The electromagnet 6 is electrically connected to the node 57 between the first resistor 55 and the first capacitor 56 to obtain the DC current after rectification and filtering. After the rectifier circuit 5, the voltage is reduced to 24V to supply the electromagnet 6. In this embodiment, the first capacitor 56 is a polar capacitor, two ends of the electromagnet 6 are connected in parallel with a second diode 61, the cathode of the second diode 61 is connected with one end of the electromagnet 6 adjacent to the connection node 57, and the anode of the second diode 61 is connected with the other end of the electromagnet 6.

The rectifier circuit 5 further includes a second resistor 58. The first end of the second resistor 58 is electrically connected to the node 57 between the first resistor 55 and the first capacitor 56, and the second end of the second resistor 58 is electrically connected to the input end 7 of the timing control circuit, so as to provide DC current to the timing control circuit. After the second resistor 58, the voltage is further reduced to 5V for use by other circuits such as the timing control circuit. In this embodiment, a voltage stabilizing diode 71, a third resistor 72 and a second capacitor 73 which are connected in parallel are electrically connected between the input end 7 of the timing control circuit and the ground. The rectifier circuit 5 of this embodiment can supply power to the timing control circuit and the electromagnet 6 simultaneously, requiring less circuit elements with simple circuit structure and low cost.

When the toaster of this embodiment conducts the certification test based on the UL1026 new standard of preventing bread from jamming, firstly the first switch 31 is short circuited with the second switch 32, and then the lifting plate 9 is operated to cause the lifting plate 9 to overcome the elastic force of the elastic element 17 and move from the ejected position toward the base 12 to the working position. At this time, the first pressing part 91 and the second pressing part 92 depress the first switch 31 and the second switch 32 respectively, such that each of the first switch 31 and the second switch 32 is in a closed state, and the short-circuit state between the first switch 31 and the second switch 32 is not changed. At the same time, the second pressing part 92 depresses the third switch 33 to a closed state, the timing control circuit turns on and starts timing, the electromagnet 6 is energized and attracts the attracting part 93 to maintain the lifting plate 9 in the working position, and the heating element 36 starts to work. After timing is over, the timing control circuit is disconnected from the electromagnet 6. After the electromagnet 6 loses current, it releases the attracting part 93. At this time, the lifting plate 9 springs upward under the action of the elastic element 17, the third switch 33 changes to an opened state, and the heating part 36 stops working. It can be seen that in the certification test, although the first switch 31 and the second switch 32 are short circuited, the third switch 33 can still spring up to cut off the connection with the live wire after the timing of the timing control circuit, so as to realize the function of power-off protection.

As described above, in the toaster of the present invention, the first switch is connected with the neutral wire terminal and the heating element; the second switch and the power-off protection switch are connected in series between the live wire terminal and the heating element; the output end of the rectifier circuit is respectively connected with the electromagnet and the timing control circuit; when the lifting plate moves from the ejected position toward the base to the working position, the first pressing part of the lifting plate depresses the first switch to a closed state, the second pressing part of the lifting plate depresses each of the second switch and the power-off protection switch to a closed state, the electromagnet is energized and attracts the attracting part of the lifting plate, and the heating element starts to work; when the electromagnet is disconnected from the timing control circuit, the attracting part is released, the lifting plate springs upward, the power-off protection switch changes to an opened state, and the heating element stops working. In the toaster of the present invention, a power-off protection switch is additionally connected in series with the live wire terminal, such that the power-off protection function can be realized when the first switch and the second switch cannot be normally changed to opened state. The structure is simple, reliable and the cost is low.

The above-mentioned embodiments only illustrate the principle and the effects of the present invention, and are not used to limit the present invention. Any person familiar with the technology may modify or change the above-mentioned embodiments without departing from the spirit and scope of this invention. Therefore, all equivalent modifications or changes made by a person with ordinary skill in the field without departing from the spirit and technical ideas disclosed in the present invention shall still be covered by the claims of the present invention.

What is claimed is:

1. A toaster, comprising:
a neutral wire terminal and a live wire terminal;
a heating circuit comprising a first switch, a second switch, a power-off protection switch and a heating element, the first switch connected between the neutral wire terminal and the heating element, the second switch and the power-off protection switch connected in series between the live wire terminal and the heating element, the power-off protection switch comprising a third switch;
an electromagnet arranged on a base of the toaster;
a timing control circuit connected with the electromagnet;
a rectifier circuit with input ends thereof connected with the heating circuit and an output end thereof respectively connected with the electromagnet and the timing control circuit;
a lifting plate connected with an elastic element, the lifting plate comprising an attracting part, a first pressing part and a second pressing part;
wherein when the lifting plate overcomes an elastic force of the elastic element and moves from an ejected position toward the base to a working position, the first pressing part depresses the first switch to a closed state, the second pressing part depresses each of the second switch and the third switch to a closed state, the electromagnet is energized and attracts the attracting part to maintain the lifting plate in the working position, and the heating element starts to work;
when the electromagnet is disconnected from the timing control circuit, the attracting part is released, the lifting plate springs upward under the action of the elastic element, the third switch changes to an opened state, and the heating element stops working;
the input ends of the rectifier circuit comprises a first input end and a second input end, a first terminal and a second terminal are provided as voltage output ends of the heating circuit, and are respectively connected with the first input end and the second input end of the rectifier circuit, the second switch and the third switch are connected in series between the live wire terminal and the first terminal, the first switch is connected between the neutral wire terminal and the second terminal, only when the first switch, the second switch and the third switch are all in a closed state, can the heating circuit supply voltage to the rectifier circuit through the first terminal and the second terminal;
a circuit board is arranged on the base, and the first switch, the electromagnet, the second switch and the third switch are arranged in sequence on the circuit board, wherein the first switch is located at one lateral side of the electromagnet, while the second switch and the third switch are located at an opposite lateral side of the electromagnet relative to the first switch, a projection of the first pressing part on the base covers the first switch, a projection of the second pressing part on the base covers both the second switch and the third switch, and a projection area of the second pressing part on the base is greater than a projection area of the first pressing part on the base.

2. The toaster according to claim 1, wherein the first switch, the second switch and the third switch are arranged sequentially in a straight line on the circuit board, and the electromagnet is located between the first switch and the second switch.

3. The toaster according to claim 2, wherein the attracting part is located between the first pressing part and the second pressing part, the first pressing part is located above the first switch, the attracting part is located above the electromagnet, and the second pressing part is located above the second switch and the third switch.

4. The toaster according to claim 3, wherein the second pressing part comprises a bottom plate, a side plate and at least one reinforcing plate, the bottom plate and the first pressing part are lower than the attracting part and parallel to the base, the side plate is located above the bottom plate and vertically connected with the bottom plate, the reinforcing plate connects the side plate and the bottom plate.

5. The toaster according to claim 1, wherein the toaster further comprises a grill and a connecting shaft, the connecting shaft is located on the outside of the grill and is arranged vertically to the base, the lifting plate is slidably connected with the connecting shaft and the grill, the elastic element is located between the lifting plate and the base, when the electromagnet releases the attracting part, the elastic element springs the lifting plate upward.

6. The toaster according to claim 1, wherein the lifting plate further comprises an operation part which protrudes laterally from the lifting plate at a position corresponding to the attracting part.

7. The toaster according to claim 1, wherein the rectifier circuit comprises a first diode, a first resistor and a first capacitor, the first diode, the first resistor and the first capacitor are connected in series between the first input end of the rectifier circuit and the second input end of the rectifier circuit, the electromagnet is electrically connected to a node of the rectifier circuit after the first diode.

8. The toaster according to claim 7, wherein two ends of the electromagnet are connected in parallel with a second diode.

9. The toaster according to claim 7, wherein the rectifier circuit further comprises a second resistor, a first end of the second resistor is electrically connected to a node between the first resistor and the first capacitor, and a second end of the second resistor is electrically connected to an input end of the timing control circuit.

10. The toaster according to claim 9, wherein a voltage stabilizing diode and a second capacitor which are connected in parallel are electrically connected between the input end of the timing control circuit and the ground.

11. The toaster according to claim 1, wherein the circuit board is arranged parallel to the base, and the elastic element is a spring sleeved on the connecting shaft.

* * * * *